United States Patent
Kim et al.

(10) Patent No.: US 12,517,799 B2
(45) Date of Patent: Jan. 6, 2026

(54) METHOD AND APPARATUS WITH TEST RESULT RELIABILITY VERIFICATION

(71) Applicant: Samsung Electronics Co., Ltd., Suwon-si (KR)

(72) Inventors: Keunseo Kim, Suwon-si (KR); Jaecheol Lee, Suwon-si (KR); Sangkyu Park, Suwon-si (KR); Sangdo Park, Suwon-si (KR); Dokyoung Kim, Suwon-si (KR); Minkyu Yang, Suwon-si (KR); Young Lee, Suwon-si (KR); Jinsic Jang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/828,022

(22) Filed: Sep. 9, 2024

(65) Prior Publication Data

US 2025/0086079 A1    Mar. 13, 2025

(51) Int. Cl.
  *G06F 11/00* (2006.01)
  *G06F 11/22* (2006.01)

(52) U.S. Cl.
  CPC .................. *G06F 11/2273* (2013.01)

(58) Field of Classification Search
  CPC .................. G06F 11/2273; G06F 11/3072
  USPC .................. 714/1–57
  See application file for complete search history.

(56) References Cited

U.S. PATENT DOCUMENTS

| | | | |
|---|---|---|---|
| 5,726,920 A | 3/1998 | Chen et al. | |
| 7,197,414 B2 | 3/2007 | Matsushita et al. | |
| 8,146,061 B2 * | 3/2012 | Xu | G06F 11/362 |
| | | | 714/38.1 |
| 2011/0150507 A1 * | 6/2011 | Kim | G06F 11/0733 |
| | | | 714/48 |
| 2013/0144557 A1 * | 6/2013 | Montfort | G06F 11/0733 |
| | | | 702/185 |
| 2014/0082430 A1 * | 3/2014 | Bartlett | G06F 11/0772 |
| | | | 714/E11.179 |
| 2015/0338847 A1 | 11/2015 | Tong et al. | |

(Continued)

FOREIGN PATENT DOCUMENTS

| | | |
|---|---|---|
| JP | 6-333791 A | 12/1994 |
| JP | 2004-96121 A | 3/2004 |

(Continued)

*Primary Examiner* — Sarai E Butler
(74) *Attorney, Agent, or Firm* — NSIP Law

(57) ABSTRACT

A method for verifying reliability of a test for products performed by test equipment includes: receiving result images generated from preprocessing of result data of the test, the result data of the test including labels for a plurality of scale levels and the received result images including first result images belonging to a first scale level of the plurality of scale levels and second result images belonging to a second scale level of the plurality of scale levels; making a first determination, from the first result images, whether the first scale level is normal or abnormal; making a second determination, from the second result images, whether the second scale level is normal or abnormal; and determining that no error occurred in the test in response to both the first scale level and the second scale level being determined to be normal; or determining that an error occurred in the test in response to at least one scale level being determined to be abnormal.

20 Claims, 15 Drawing Sheets

(56) References Cited

U.S. PATENT DOCUMENTS

2018/0210774 A1* 7/2018 Young .................. G06F 11/0751
2020/0349235 A1* 11/2020 Siwek ..................... G06F 30/20
2022/0237110 A1* 7/2022 Gryka .................. G06F 11/3692

FOREIGN PATENT DOCUMENTS

| JP | 2005-284650 A | 10/2005 |
| JP | 2006-319220 A | 11/2006 |
| JP | 2007-79933 A | 3/2007 |
| KR | 10-2004-0031904 A | 4/2004 |
| KR | 10-2006-0100489 A | 9/2006 |
| KR | 10-2007-0104073 A | 10/2007 |
| KR | 10-1466798 B1 | 12/2014 |

* cited by examiner

FIG. 1B

FIG. 5 lot01 >> test01_slot01

|    | 1   | 2   | 3   | 4   | 5   | 6   | 7   | 8   | 9   | 10  | 11  | 12  | 13  | 14  | 15  | 16  |
|----|-----|-----|-----|-----|-----|-----|-----|-----|-----|-----|-----|-----|-----|-----|-----|-----|
| 1  | 101 | 101 | 101 | 101 | 101 | +   | 101 | 101 | 101 | +   | 101 | 101 | 0   | 101 | 101 | 101 |
| 2  | 0   | 0   | 0   | 0   | 240 | 0   | 0   | 0   | 0   | 0   | 240 | 240 | 240 | 0   | 0   | 0   |
| 3  | 0   | 101 | 0   | 0   | 0   | 0   | 0   | 0   | 0   | 0   | 0   | 0   | 0   | 0   | 0   | 0   |
| 4  | 0   | 0   | 0   | 0   | 0   | 0   | 101 | 0   | 101 | 101 | 0   | 0   | 0   | 101 | 101 | 101 |
| 5  | 0   | 0   | 240 | 240 | 240 | 240 | 0   | 240 | 240 | 240 | 240 | 240 | 240 | 0   | 0   | 0   |
| 6  | 240 | 0   | 0   | 0   | 0   | 0   | 0   | 0   | 0   | 0   | 0   | 0   | 0   | 0   | 0   | 0   |
| 7  | 0   | 0   | 0   | 240 | 0   | 0   | 0   | 0   | 0   | 0   | 0   | 0   | 0   | 0   | 0   | 0   |
| 8  | 0   | 0   | 0   | 0   | 0   | 0   | 0   | 0   | 0   | 0   | 0   | 0   | 0   | 0   | 0   | 0   |
| 9  | 0   | 0   | 0   | 0   | 0   | 0   | 0   | 0   | 103 | 0   | 0   | 0   | 0   | 0   | 0   | 0   |
| 10 | 0   | 0   | 0   | 0   | 0   | 0   | 0   | 0   | 0   | 0   | 103 | 0   | 0   | 0   | 0   | 0   |
| 11 | 0   | 0   | 0   | 0   | 0   | 0   | 0   | 0   | 0   | 0   | 0   | 0   | 0   | 0   | 103 | 0   |
| 12 | 0   | 0   | 0   | 0   | 0   | 0   | 0   | 0   | 0   | 0   | 0   | 0   | 0   | 0   | 0   | 0   |

METHOD AND APPARATUS WITH TEST RESULT RELIABILITY VERIFICATION

CROSS-REFERENCE TO RELATED APPLICATIONS

This application claims priority to and the benefit under 35 USC § 119 (a) of Korean Patent Application No. 10-2023-0119980 filed at the Korean Intellectual Property Office on Sep. 8, 2023, the entire contents of which are incorporated herein by reference.

BACKGROUND

1. Field

The present disclosure relates to a method and an apparatus with product test result reliability verification.

2. Description of Related Art

If a low yield is detected as a result of testing a product, a technician may directly determine whether the low yield is due to an error in a process of manufacturing the product, or whether the low yield is a result of a problem in the test. That is, there is an issue of whether a product is faulty, or whether a test of the product is faulty.

The technician relies on know-how and experience to analyze reliability of the test result of the product, but it is difficult to quantitatively guarantee reliability of an analysis result thereof, and accumulation of know-how by the professional technician is essential.

SUMMARY

In one general aspect, a method is for verifying reliability of a test for products performed by test equipment, and the method includes: receiving result images generated from preprocessing of result data of the test, the result data of the test including labels for a plurality of scale levels and the received result images including first result images belonging to a first scale level of the plurality of scale levels and second result images belonging to a second scale level of the plurality of scale levels; making a first determination, from the first result images, whether the first scale level is normal or abnormal; making a second determination, from the second result images, whether the second scale level is normal or abnormal; and determining that no error occurred in the test in response to both the first scale level and the second scale level being determined to be normal; or determining that an error occurred in the test in response to at least one scale level being determined to be abnormal.

Each label may include an identifier of a scale level.

The method may further include classifying the result images by their corresponding scale levels according to the labels.

Element areas of the result images may include respective values, each value representing an individual test result of a corresponding product.

The making the first determination may be based on a first feature extracted from the first result images by a neural network; and the making the second determination may be based on a second feature extracted from the second result images by the neural network or by another neural network.

The neural network may include a convolution neural network (CNN) or a transformer network.

The making the first determination may include: calculating a statistic indicating a distance measure between a distribution of features of a ground truth image corresponding to the first scale level and a distribution of features of the first result images corresponding to the first scale level; and making the first determination by comparing the statistic with a predetermined reference value.

The comparing the statistic with the predetermined reference value may include: determining that the first result images satisfies a first condition based on determining that the statistic is greater than the predetermined reference value.

The ground truth image may be derived from ground truth test result data of a prior test performed by the test equipment.

In another general aspect, an apparatus is for verifying reliability of a test for products performed by test equipment, and the apparatus includes: one or more processors and a memory storing instructions configured to cause the one or more processors to perform a process comprising: receiving result images generated from preprocessing of result data of the test, the result data including labels for a plurality of scale levels and the received result images including first result images belonging to a first scale level of the plurality of scale levels and second result images belonging to a second scale level of the plurality of scale levels; making a first determination, from the first result images, whether the first scale level is normal or abnormal; making a second determination, from the second result images, whether the second scale level is normal or abnormal; and determining whether an error occurred in the test based on the first determination and the second determination.

Each label may include an identifier of a scale level.

The process may further include classifying the result images by their corresponding scale levels according to the labels.

The result data may include device-under-test (dut) maps respectively associated with the labels, wherein each of the dut maps may include element areas each comprising a value determined by the test equipment during performance of the test.

The making the first determination may be based on a first feature extracted from the first result images by a neural network; and the making the second determination may be based on a second feature extracted from the second result images by the neural network or by another neural network.

The neural network may comprise a convolution neural network (CNN) or a transformer network.

The making the first determination comprises: calculating a statistic indicating a distance measure between a distribution of features of a ground truth image corresponding to the first scale level and a distribution of features of the first result images corresponding to the first scale level; and making the first determination by comparing the statistic with a predetermined reference value.

The comparing the statistic with the predetermined reference value may include determining that the first result images satisfies a first condition based on determining that the statistic is greater than the predetermined reference value.

The ground truth image may be derived from ground test result data of a prior test performed by the test equipment.

In another general aspect, a system is for verifying reliability of a test of products, and the system includes: test computers each configured to perform the test on a respective set of the products and each test computer collecting a corresponding result map having element areas indicating individual test results respectively corresponding products; and a reliability verification computer configured to determine whether a reliability condition of the test is satisfied based on the result maps and based on scale levels of the result maps, the scale levels corresponding to hierarchical scales in testing the products.

The hierarchal scales may include at least two of: a lot-level scale representing a production block of the products, a board-level scale of boards on which the products are installed for the test, a slot-level scale for the boards to interface with the test computers, and an equipment-level scale of the test computers performing the test on the products installed on the boards.

Other features and aspects will be apparent from the following detailed description, the drawings, and the claims.

BRIEF DESCRIPTION OF THE DRAWINGS

FIGS. 1B and 1C illustrate result data of a test output from a test equipment according to one or more embodiments.

FIG. 5 illustrates an example of the result data of the test according to one or more embodiments.

FIG. 6A illustrates an example of a result image preprocessed with a binary matrix according to one or more embodiments.

Figure 1A:
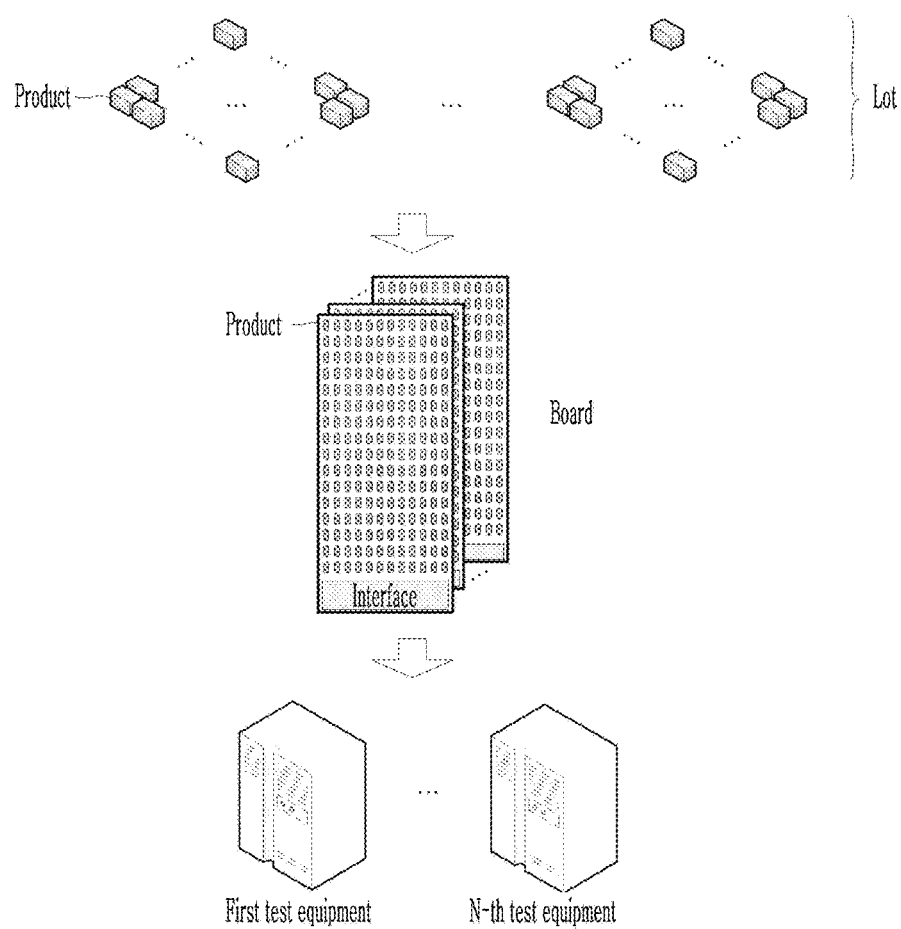
FIG. 1A illustrates a test process of testing a product according to one or more embodiments.

Throughout the drawings and the detailed description, unless otherwise described or provided, the same or like drawing reference numerals will be understood to refer to the same or like elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after an understanding of the disclosure of this application may be omitted for increased clarity and conciseness.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The terminology used herein is for describing various examples only and is not to be used to limit the disclosure. The articles "a," "an," and "the" are intended to include the plural forms as well, unless the context clearly indicates otherwise. As used herein, the term "and/or" includes any one and any combination of any two or more of the associated listed items. As non-limiting examples, terms "comprise" or "comprises," "include" or "includes," and "have" or "has" specify the presence of stated features, numbers, operations, members, elements, and/or combinations thereof, but do not preclude the presence or addition of one or more other features, numbers, operations, members, elements, and/or combinations thereof.

Throughout the specification, when a component or element is described as being "connected to," "coupled to," or "joined to" another component or element, it may be directly "connected to," "coupled to," or "joined to" the other component or element, or there may reasonably be one or more other components or elements intervening therebetween. When a component or element is described as being "directly connected to," "directly coupled to," or "directly joined to" another component or element, there can be no other elements intervening therebetween. Likewise, expressions, for example, "between" and "immediately between" and "adjacent to" and "immediately adjacent to" may also be construed as described in the foregoing.

Although terms such as "first," "second," and "third", or A, B, (a), (b), and the like may be used herein to describe various members, components, regions, layers, or sections, these members, components, regions, layers, or sections are not to be limited by these terms. Each of these terminologies is not used to define an essence, order, or sequence of corresponding members, components, regions, layers, or sections, for example, but used merely to distinguish the corresponding members, components, regions, layers, or sections from other members, components, regions, layers, or sections. Thus, a first member, component, region, layer, or section referred to in the examples described herein may also be referred to as a second member, component, region, layer, or section without departing from the teachings of the examples.

Unless otherwise defined, all terms, including technical and scientific terms, used herein have the same meaning as commonly understood by one of ordinary skill in the art to which this disclosure pertains and based on an understanding of the disclosure of the present application. Terms, such as those defined in commonly used dictionaries, are to be interpreted as having a meaning that is consistent with their meaning in the context of the relevant art and the disclosure of the present application and are not to be interpreted in an idealized or overly formal sense unless expressly so defined herein. The use of the term "may" herein with respect to an example or embodiment, e.g., as to what an example or embodiment may include or implement, means that at least one example or embodiment exists where such a feature is included or implemented, while all examples are not limited thereto.

Figure 10:
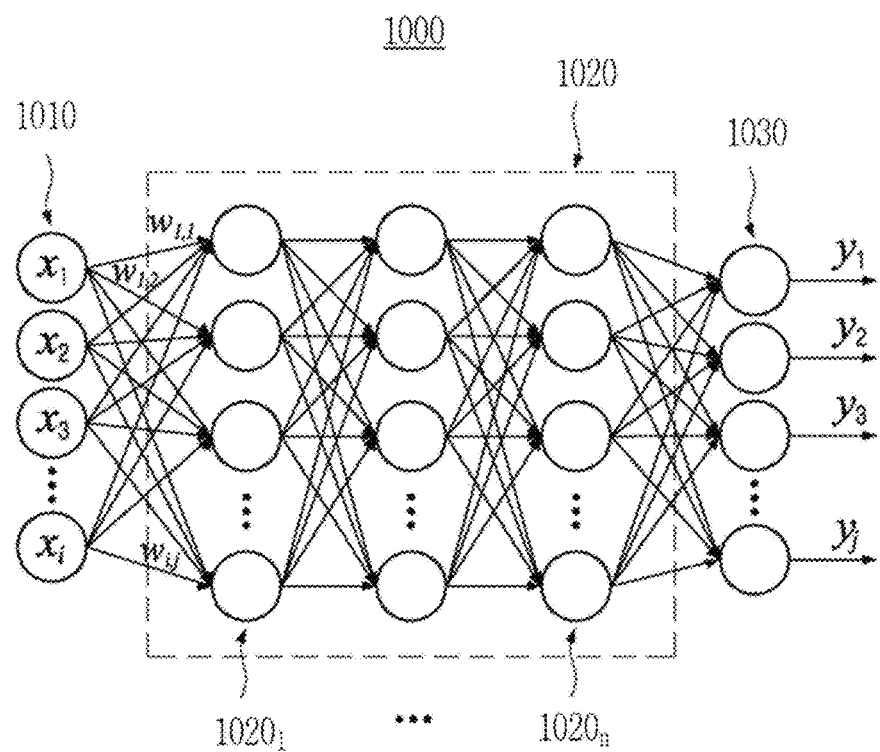
FIG. 10 illustrates a neural network according to one or more embodiments.

An artificial intelligence (AI) model of the present disclosure may be a machine learning model that learns at least one task, and may be implemented as a computer program in the form of instructions executed by a processor. The task that the AI model learns refers to a task to be solved through machine learning or a task to be executed through machine learning. The AI model may be implemented as a computer program executed on a computing apparatus, may be downloaded through a network, or may be sold as a product. Alternatively, the AI model may be networked with a variety of devices. A neural network example of an AI model is shown in FIG. 10.

Figure 1B:
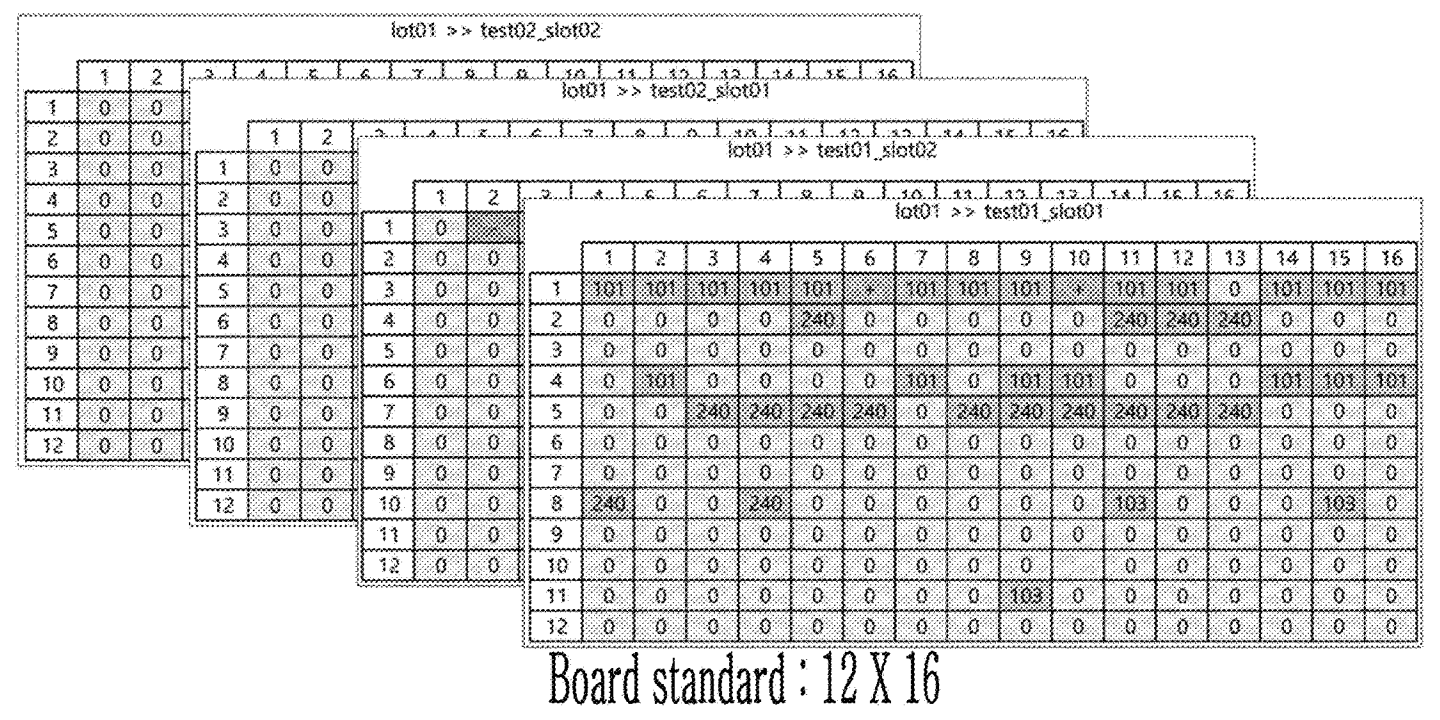
Figure 1C:
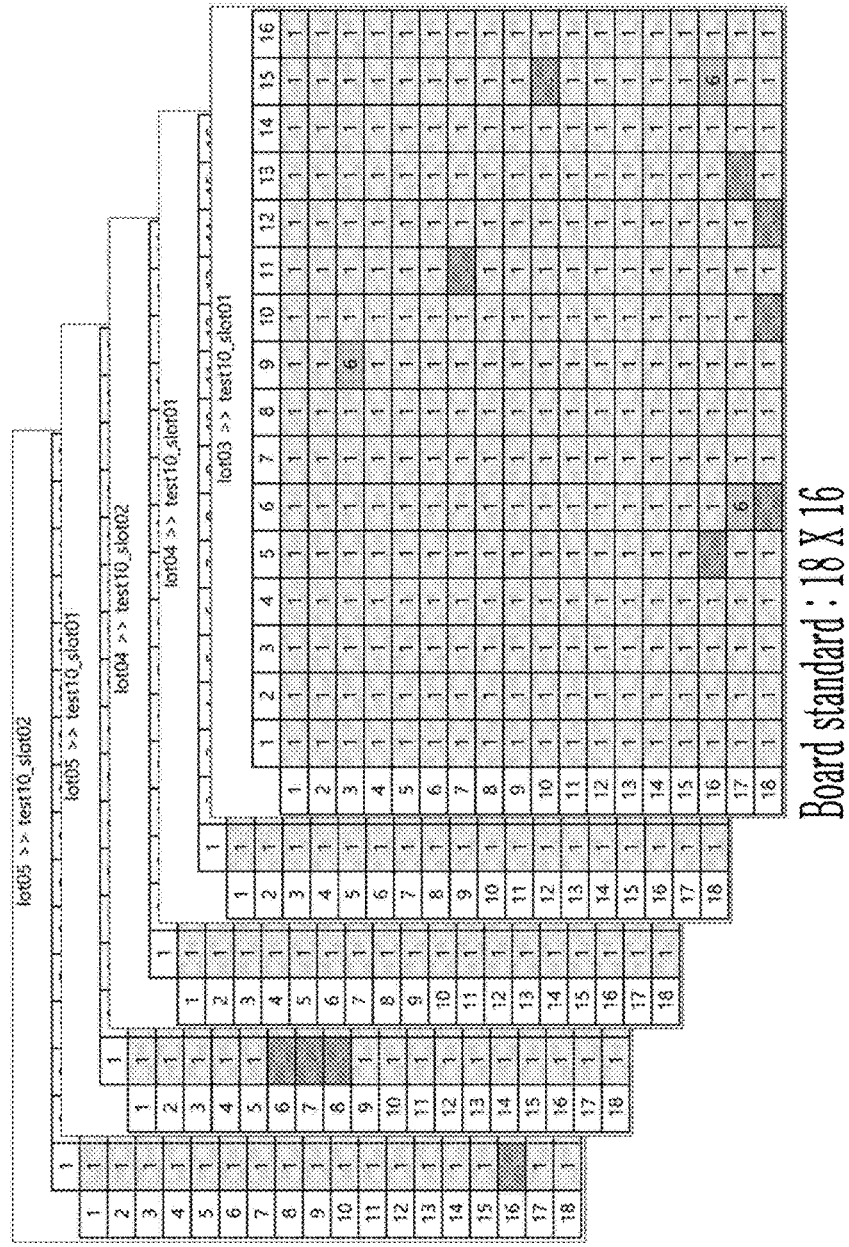

FIG. 1A illustrates a test process of a testing a product according to one or more embodiments, and FIGS. 1B and 1C illustrate result data of a test output from a test equipment according to one or more embodiments.

Referring to FIG. 1A, a product (e.g., chips) produced through a manufacturing process may be installed on a board for testing (e.g., a circuit board, a breadboard, etc.). Test equipment may perform a test of the product installed on the board after the board has been inserted into a slot (or any communication interface) of a test equipment (e.g., a test computer). The test equipment, which may include multiple slots, may perform the test on the product by communicating with the product through a hardware interface of the board while the board is mated with the slot. The test equipment may perform the test on multiple product-containing boards in the respective slots and may output result data of the test of the product on a board-by-board basis. That is, there may be a test result for each respective board. An individual product item may be tested by signals sent to it by the test equipment.

In some embodiments, steps of the test of the product may be performed at different scales. For example, such scales might include: a lot representing a management block of the product before the test; a board on which the product is installed for the test of the product; a slot/interface through which a board communicates with the test equipment; and the test equipment performing the test on the product installed on the board. Reliability of the test for each scale may be verified.

As noted, a product produced through a manufacturing process may be managed on a lot scale (a batch of product being considered one lot). The lot may be a unit by which production of the product is managed. Products belonging to the same lot may be tested by being installed on the same board or different boards. Alternatively, products of the same lot may be tested by the same test equipment or different test equipment.

For example, products belonging to Lot 1 may be installed on Board 1 and Board 2), which may be inserted into slots of the same test equipment (or may be inserted into slots of different test equipment). Product that is a subject of a test may be referred to as a device under test (DUT).

In some embodiments, the product may be a semiconductor package. As a non-limiting example, the semiconductor package may be an embedded multi-media card (eMMC) in which a flash memory and a controller are integrated, or, an embedded multi-chip package (eMCP) in which the eMMC and a DRAM are integrated into one package. Referring to FIG. 1A, a number of semiconductor packages, for example 192, may be installed on one board to be tested by the test equipment.

Test result data may be recorded in matrices with dimensions corresponding to dimensions of the boards; a matrix cell/item may store results for a corresponding piece of produce. FIGS. 1B and 1C show, respectively, result data of a test output from test equipment using a board of 12×16 standard dimension may be in 12×16 matrices, and result data of a test output from test equipment using a board of 18×16 standard dimension. Each cell/item (matrix element) data may store a result (e.g., indicating pass or fail, or numbers thereof) of the test of the product installed on the board. As shown in FIGS. 1B and 1C, a matrix storing result data may be referred to as dutmap (device-under-test map).

In some embodiments, a label may be added to the result data output from each test equipment. The label may include an identifier for the scale. For example, the label may include an identifier of the lot to which the product (the DUT) installed on the board belongs, an identifier of the test equipment that outputs the result data, and an identifier of the slot of the test equipment. Some examples of labels are described next.

It may be seen from the labels shown in FIG. 1B (top of dutmaps) that the result data of the 12×16 standard is for products belonging to Lot 1 (lot01) and output from Test equipment 1 (test01) and Test equipment 2 (test02). The labels may also include slot numbers of respective dutmaps.

It may be seen from the labels shown in FIG. 1C that the result data of the 18×16 standard is of products belonging to Lot 3 (lot03), Lot 4 (lot04), and Lot 5 (lot05), and all of the result data of the 18×16 standard are output from Test equipment 10 (test10).

Referring to FIG. 1B, a "0" in an element of the result data of a 12×16 standard dutmap may indicate that the test result of the corresponding product is a "pass". On the other hand, numbers such as "101", "103", and "240" in the elements of result data of the 12×16 standard dutmap may indicate that the test results of the products at the respectively corresponding board positions are "fail" (e.g., failure codes). A "+" in an element of the result data of the 12×16 standard dutmap may indicate that no product is installed at the board position corresponding to the sign "+".

Referring to FIG. 1C, a "1" in an element the result data of the 18×16 standard dutmap may indicate that the test result of the corresponding product is a "pass". A "6" in elements of the result data of the 18×16 standard dutmap may indicate that the test results of the products installed at the respectively corresponding board positions are "fail". A period (".") in an element of the result data of the 18×16 standard dutmap may indicate that no product was installed at the corresponding board position.

Figure 2:
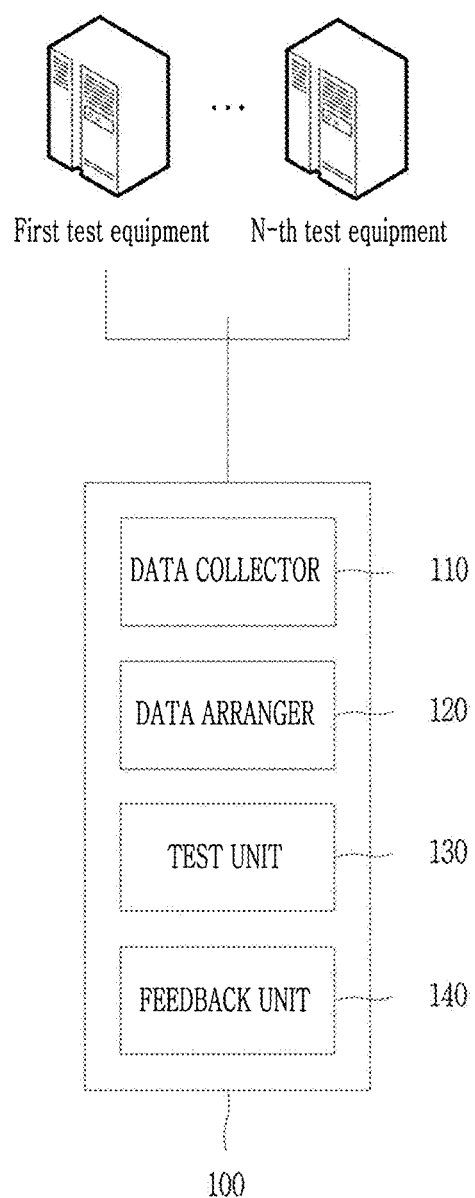
FIG. 2 illustrates an apparatus for verifying reliability of a test according to one or more embodiments.
Figure 3:
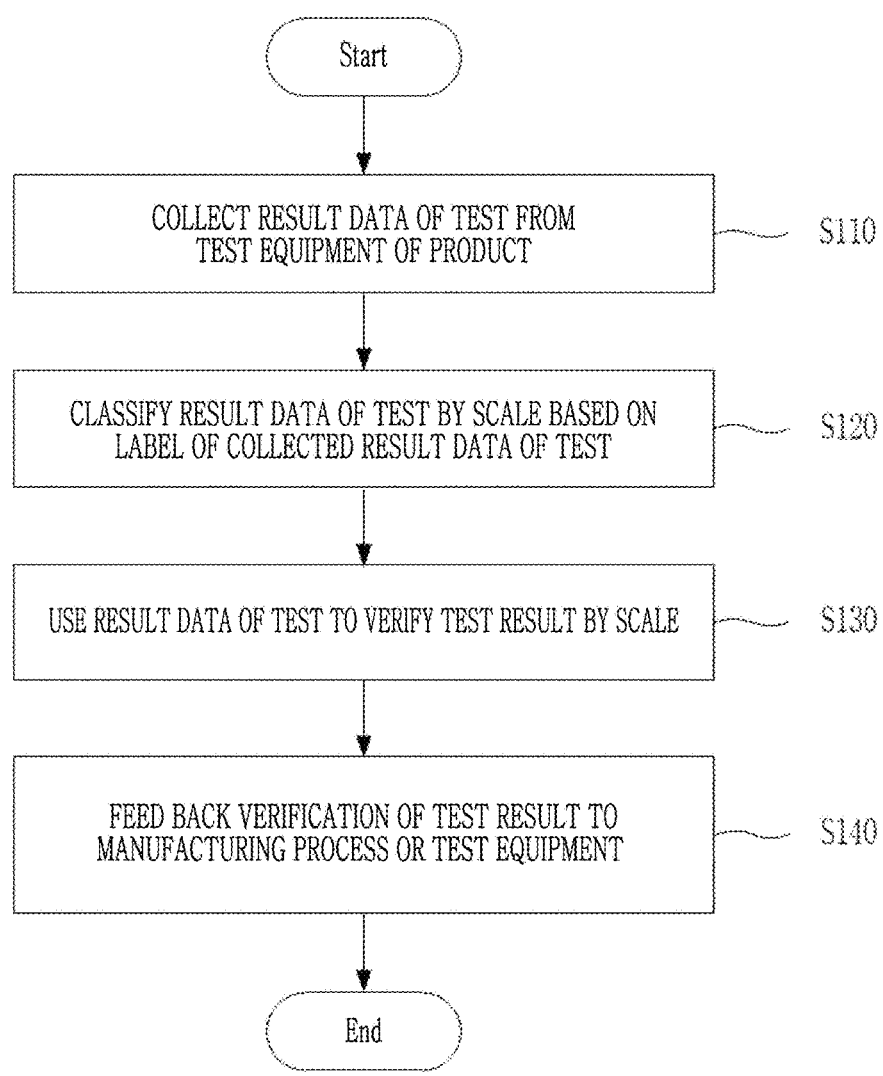
FIG. 3 illustrates a method for verifying the reliability of a test according to one or more embodiments.

FIG. 2 illustrates an apparatus for verifying reliability of a test according to one or more embodiments and FIG. 3 illustrates a method for verifying the reliability of a test according to one or more embodiments. In the discussion of FIGS. 2 and 3, "scale" refers to a level of granularity of test data or a level in a hierarchy of communication with the product. For example, a scale might be a lot-level scale, a test-equipment level scale, or a slot-level scale.

Referring to FIG. 2, a reliability verification apparatus 100 for verifying reliability of a test according to one or more embodiments may include a data collector 110, a data arranger 120, a test unit 130, and a feedback unit 140. The units of the reliability verification apparatus 100 are arbitrary; the functionality of the units may be arranged in different units or modules.

The data collector 110 may collect result data (e.g., "pass" or "fail") of a test outputted by a test equipment that performs a test of a product. The data collector 110 may also determine a scale to be "normal" based on the collected result data. Because the reliability verification apparatus 100 verifies the reliability of the test performed on the product, a lot-level scale that is not directly related to the test of the product may be determined as a normal scale. In other words, the scope of a "lot" of production may not be the same as the scope of a lot-level scale of test data.

In some embodiments, the data collector 110 may determine a lot to be normal when the has a number of "pass" results above a predetermined threshold number. Alternatively, the data collector 110 may determine a lot to be a normal lot when the lot has a ratio of "pass" results to "fail" results above a predetermined threshold ratio. The result data of a lot determined to be normal may be used later to determine whether a specific scale is normal.

The data collector 110 may also preprocess the collected result data to generate result images (result images are described later). Result data collected by the data collector 110 may be converted to a result image and then, whether a target scale (e.g., equipment-level scale) corresponding to the result image is "normal" may be determined based on a distribution of features extracted from the result images.

The data arranger 120 may classify result images by their corresponding scales using a label of the result data of the test (e.g., a label of a dutmap). When the label includes a lot identifier, a test equipment identifier, and slot identifier, the data arranger 120 may classify the result images by the identifier of the lot, may classify the result images by the identifier of the test equipment, and may classify the result images by the identifier of the slot. For example, when the product is managed by three lots, the data arranger 120 may classify the result images corresponding to the lot identifier 01, may classify the result images corresponding to the lot identifier 02, and may classify the result images corresponding to the lot identifier 03.

The test unit 130 may determine whether each scale (e.g., slot, equipment, lot) of a test result is "normal" or "abnormal" by performing a statistical hypothesis test using a neural network. For example, when the product is managed by three lots, the test unit 130 may perform a first statistical hypothesis test using result images classified into the lot identifier 01, may perform a second statistical hypothesis test using the result images classified into the lot identifier 02, and may perform a third statistical hypothesis test using the result images classified into the lot identifier 03, so that verification of the reliability of the test is completed for the lot-level scale.

In some embodiments, when all scales (e.g., the lot, the test equipment, and the slot) are determined to be "normal", the test unit 130 may determine that the reliability of the test itself is verified. However, when at least one scale is determined to be "abnormal", the test unit 130 may determine that a problem or an error occurs in the test itself. In other words, the reliability of a test may be classified/verified based on normal/abnormal evaluations of the test at different scales. For example, a certain level of uniformity or distribution of results at each scale might indicate a reliable test, whereas a not having the certain level of uniformity or distribution of results at any scale might indicate an unreliable test.

In some embodiments, the test unit 130 may perform the statistical hypothesis test by determining whether a null hypothesis is rejected. When the null hypothesis is selected/inferred by a trained neural network, the test unit 130 may determine that no problem occurs in the test itself. In this case, it may be determined that a non-uniformity problem in a yield of the product is due to a problem in the manufacturing of the product rather than the testing itself. In some embodiments, an alternative hypothesis means that the result data of the test of the product is not uniform, and when the alternative hypothesis is selected by the trained neural network, the test unit 130 may determine that there was a problem in the test itself rather than the manufacturing of the product.

When the test unit 130 determines, for example, that all scales are "normal", the feedback unit 140 may generate a notification that a problem with the yield occurred due to the manufacturing process. When the test unit 130 determines that at least one scale is "abnormal" (but another scale is "normal"), the feedback unit 140 may generate a notification that a problem occurred in the test itself. Note that although three scales of evaluation/data are described, the same techniques may be used with only two scales, or more than three scales.

Referring to FIG. 3, the data collector 110 may collect the result data of the test from the test equipment of the product through data pipelines (S110). The result data of the test may be in the form of dutmaps that include respective labels; as described above, the labels of the result data may include identifiers of the different scales (each scale may have a different corresponding set of identifiers). In other words, the result data of the test may have data levels of scale. Next, a method for collecting the result data of the test is described with reference to FIG. 4.

Figure 4:
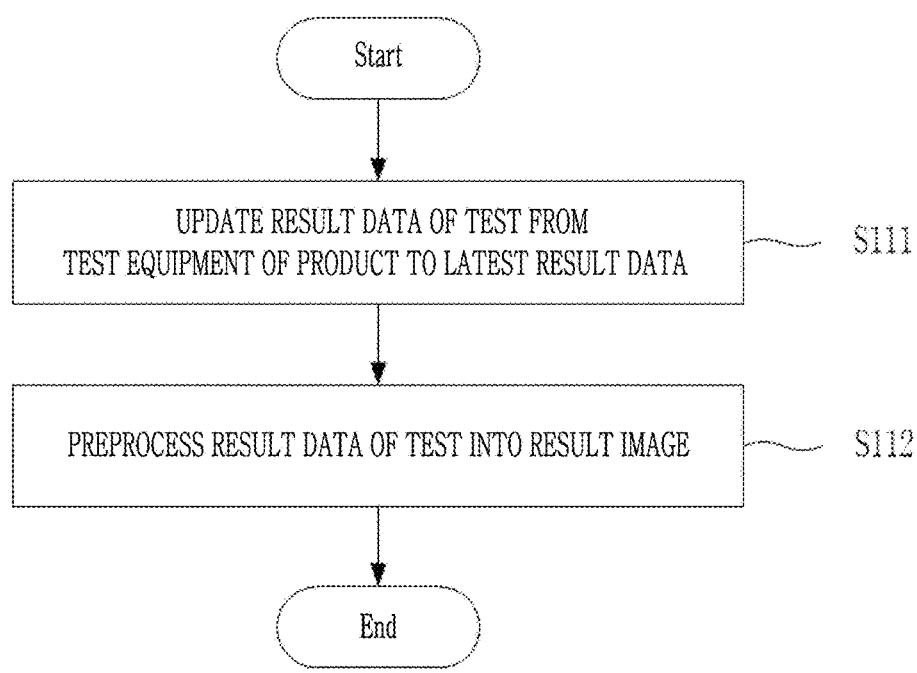
FIG. 4 illustrates a method for collecting the result data of the test according to one or more embodiments.

FIG. 4 illustrates a method for collecting result data of a test according to one or more embodiments and FIG. 5 illustrates an example of result data of a test according to one or more embodiments.

The data collector 110 may request result data of a test from the test equipment of the product and may receive a latest result data from the test equipment to update the received latest result data (S111). When deterioration of the yield of the product is detected by a low yield detector or the like (e.g., a sufficient amount or ratio of "failed" products), the data collector 110 may collect the result data of the test to determine whether the low yield is due to a problem in the manufacturing process or a problem in the test itself (e.g., a problem in the test equipment).

The data collector 110 may generate a result image by preprocessing the received result data of the test (S112). The result image may be a binary matrix (or image) in which the test result is expressed as elements having values of "0" or "1". Alternatively, the result image may be expressed as a grayscale image in which the test result is expressed with pixels/elements having brightness values. Further, the result image may be a color (multi-dimension) image in which the test result is expressed with pixels/elements having color values.

Figure 6A:
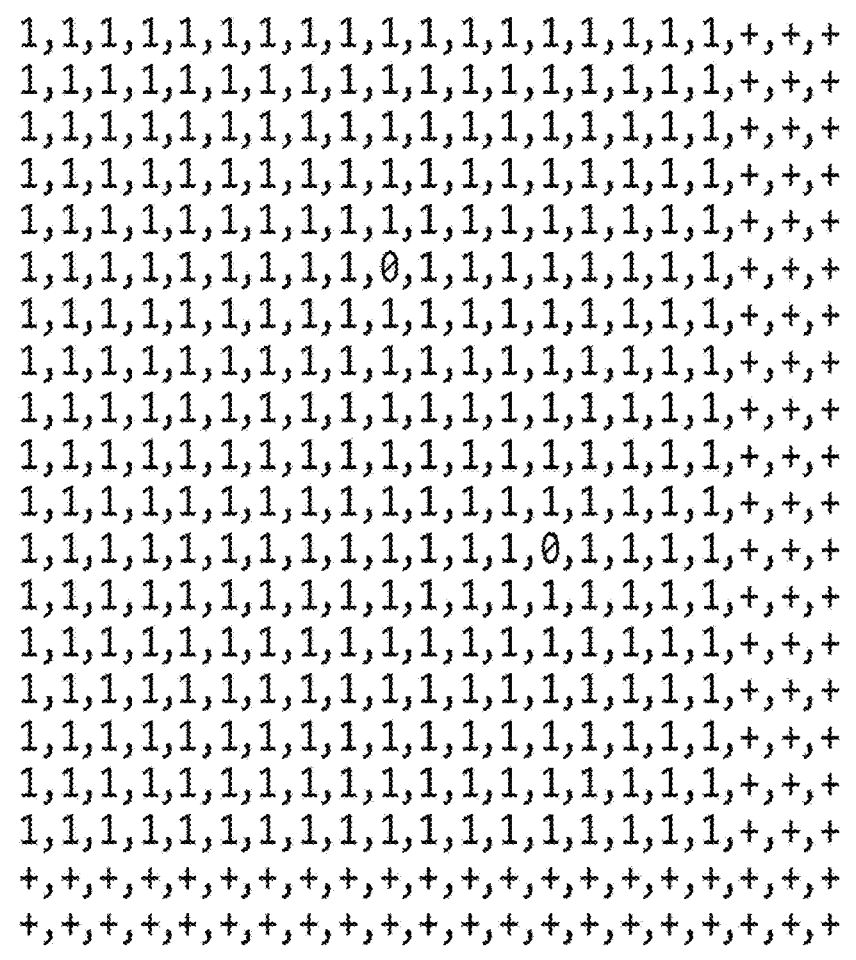
Figure 6B:
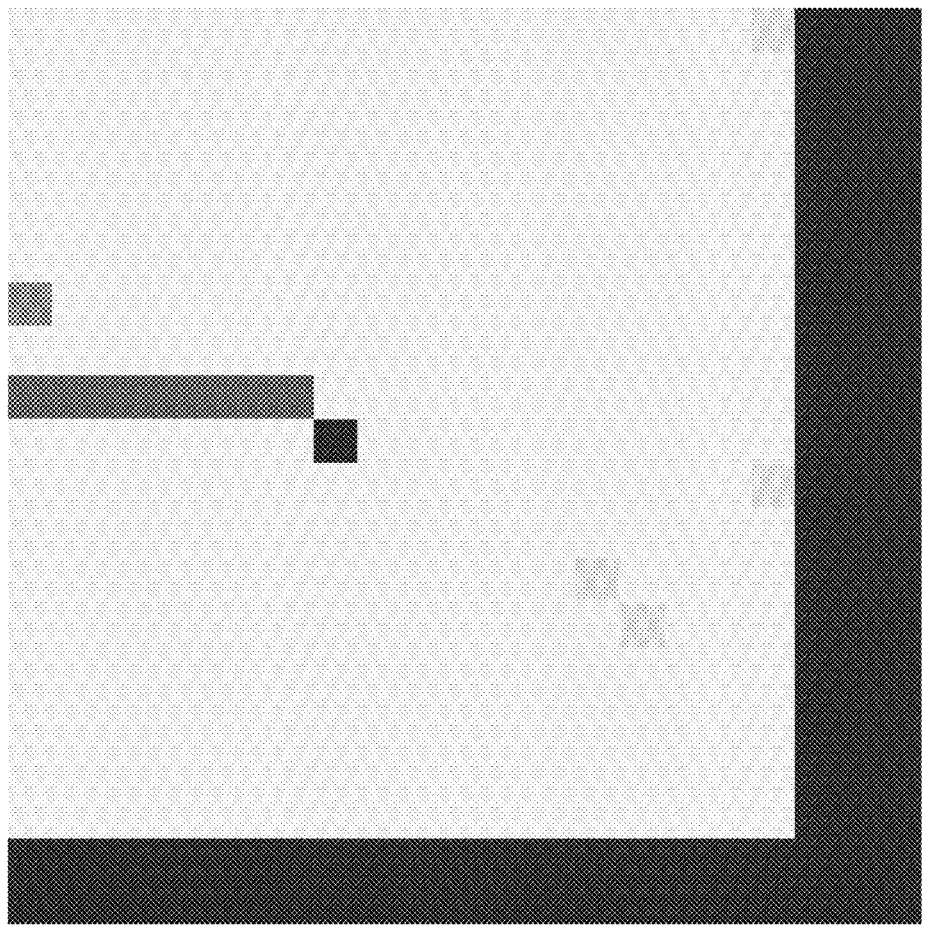
FIG. 6B illustrates an example of a result image preprocessed with a true color according to one or more embodiments.

FIG. 6A illustrates an example of a result image preprocessed into a binary matrix/image according to one or more embodiments. FIG. 6B illustrates an example of a result image preprocessed into a grayscale image according to one or more embodiments.

Referring to FIG. 6A, each "0" and "1" in the binary matrix image may correspond to a piece of product installed on a board. A "1" in an element of the binary matrix may represent the corresponding piece of product "passed" the test, and a "0" in an element may represent the corresponding piece of product "failed" the test. In FIG. 6A, a "+" may indicate that no product was connected at the corresponding position.

Referring to FIG. 6B, each brightness value in the grayscale image may indicate a corresponding test result. The preprocessed image/matrix in FIG. 6B may be grayscale, in the sense that each pixel/element has a single scalar value (e.g., from 0-255). Different brightness values may represent different results. An element area with the highest brightness value (e.g., the brightest gray area) may indicate that the product at the corresponding position "passed" the test. Second, third, and fourth brightness values (e.g., different gray areas) may correspond to respective error codes. The lowest brightness value (e.g., the darkest gray or black area) may indicate that no product was connected at the corresponding position.

Referring to FIG. 3, the data arranger 120 may classify the result data by the scale based on the labels of the collected result data (S120) (e.g., using dutmaps outputted by the test equipment). Alternatively, when the data collector 110 generates a result image by preprocessing the collected result data, the data arranger 120 may classify the preprocessed result image by scale based on the label of the result data. For example, the data arranger 120 may classify the result data or the result image according to the lot identifier of the label, may classify the result data or the result image according to the slot identifier of the label, and may classify the result data or the result image according to the test equipment identifier of the label. In other words, one or more result images/matrices may be generated for each scale level based on the scales indicated in the labels of the result data, and each such image/matrix may be associated with information identifying its scale.

Next, the test unit 130 may verify the reliability of the test result using the neural network based on the result images classified by their respective scales (S130). The neural network may receive a given test result image and infer whether the image is "normal" or "abnormal". For example, when there are three lots, the test unit 130 may (i) determine whether a first lot is "normal" or "abnormal" using all result images having the identifier of (or associated with) the first lot, may (ii) determine whether a second lot is "normal" or "abnormal" using all result images having the identifier of the second lot, and (iii) may determine whether a third lot is "normal" or "abnormal" using all result images having the identifier of the third lot. When all three lot-level result images are determined to be "normal", the test unit 130 may determine that the lot-level scale for the test is "normal". However, when at least one lot is determined to be "abnormal", the test unit 130 may determine that the lot scale is "abnormal". The test unit 130 may similarly determine whether each of the remaining scale(s) such as the board-level scale, the slot-level scale, and/or the test-equipment-level scale, or the like is "normal" or "abnormal" using the same method as performed for the lot-level scale.

In some embodiments, the test unit 130 may verify the reliability of the test result by determining whether yields at each level of scale is uniformly measured. The test unit 130 may verify the reliability of the test result by performing the statistical hypothesis test using the neural network. The statistical hypothesis test may be either a two-sample test or a Moran's I test, as non-limiting examples. A specific method by which the test unit 30 may verify the reliability of a test result by performing the statistical hypothesis test using the neural network is described with reference to FIG. 7.

Again referring to FIG. 3, when "abnormality" is determined in at least one scale level, the test unit 130 may determine that an error occurred in the test (the test itself is unreliable). In this case, the feedback unit 140 may feed and indication of the occurrence of the error in the test back to the test equipment. An action may be taken on a test equipment, a slot, a board, or the like by referring to the scale in which "abnormality" is determined. Alternatively, when all scales are determined to be "normal", the test unit 130 may determine that no error occurred in the test (the test is reliable). When it is determined that no error occurred in the test, the feedback unit 140 may provide feedback that there is a problem in the manufacturing process of the product. That is, when it is determined that no error occurs in the test but a low yield condition is detected by the low yield detector, the feedback unit 140 may provide feedback that an error occurred in the manufacturing process (S140).

Figure 7:
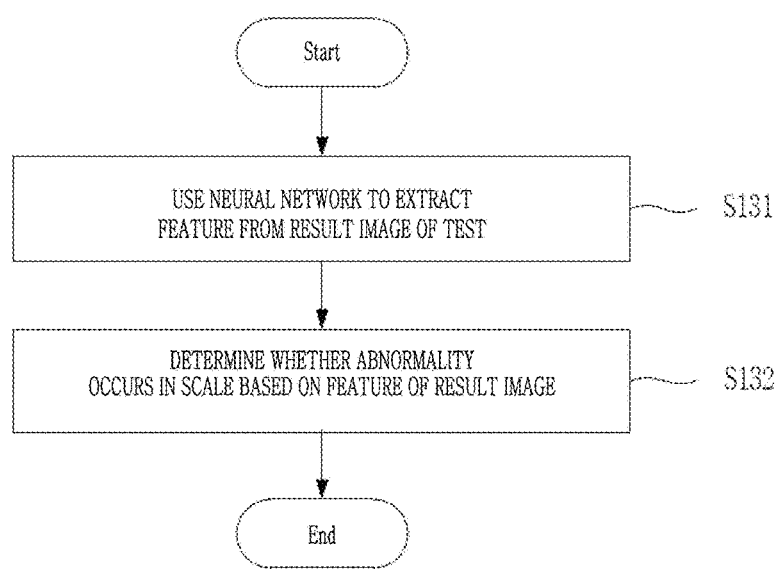
FIG. 7 illustrates a method for verifying a result of the test according to one or more embodiments.
Figure 8:
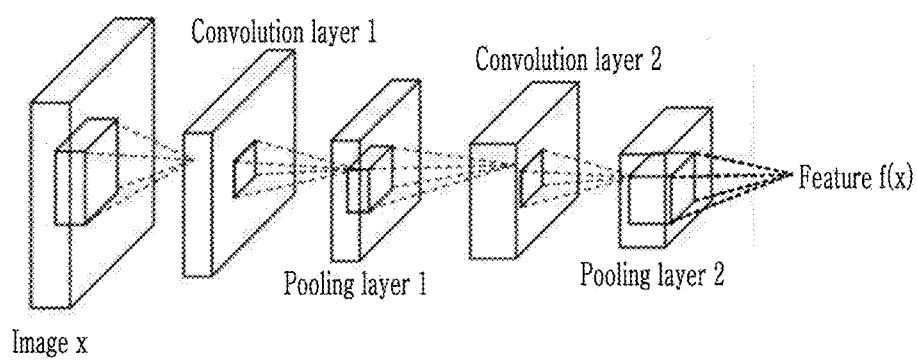
FIG. 8 illustrates a convolution neural network (CNN) extracting a feature from a result image according to one or more embodiments.
Figure 9A:
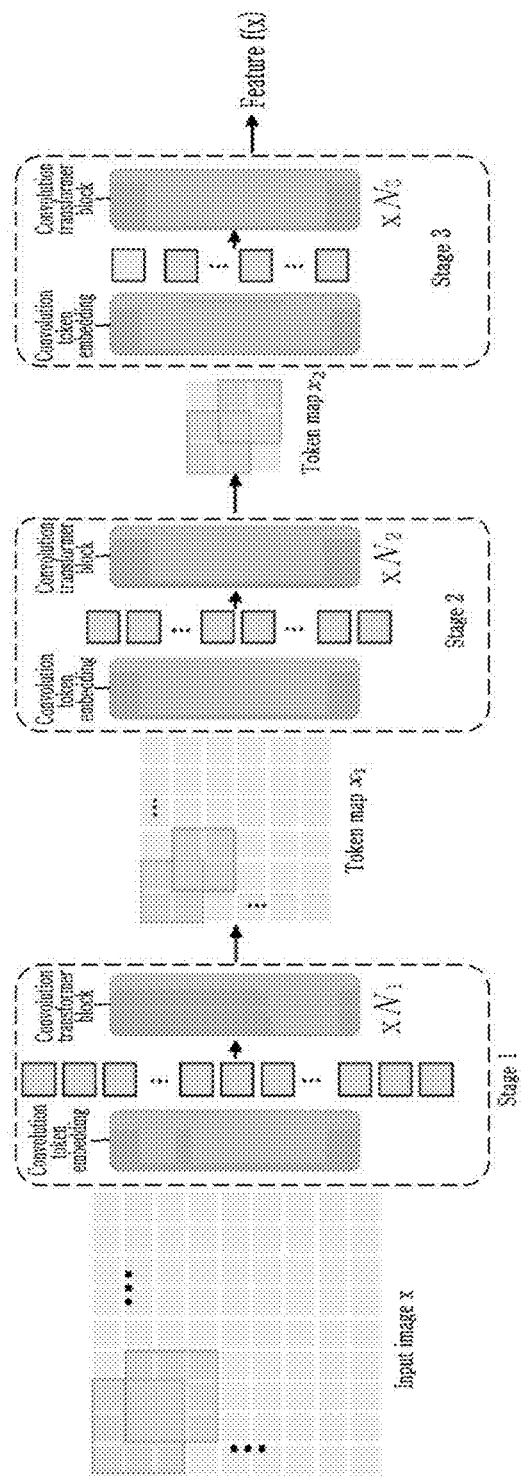
FIG. 9A and FIG. 9B illustrate a transformer network extracting a feature from a result image according to one or more embodiments.
Figure 9B:
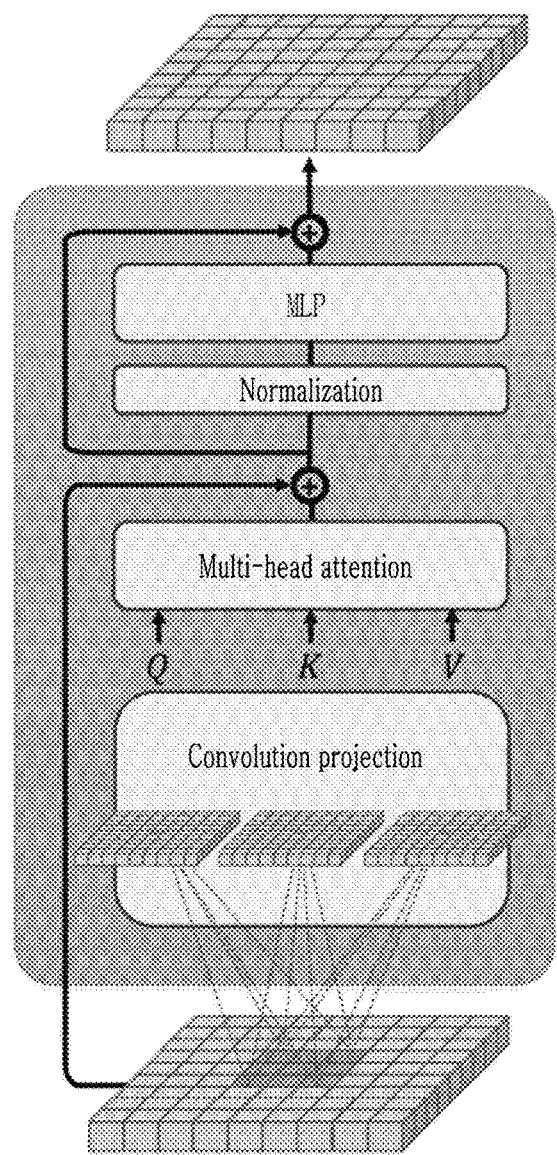

FIG. 7 illustrates a method for verifying the result of a test according to one or more embodiments. FIG. 8 illustrates a convolution neural network (CNN) extracting a feature from a result image according to one or more embodiments. FIGS. 9A and 9B illustrate a transformer network extracting a feature from a result image according to one or more embodiments.

Referring to FIG. 7, the reliability verification apparatus 100 according to one or more embodiments may extract a feature from a result image of a test using a neural network (S131). When the result image input to the neural network is x, the feature (or a feature map) of the result image output from the neural network may be expressed as f(x).

The test unit 130 of the reliability verification apparatus 100 may extract a feature (or feature map) from the result image(s) at each scale level. When a result image of the test is arranged for each scale by the data arranger 120 of the reliability verification apparatus 100, the test unit 130 may extract the feature of the result image using the neural network.

In some embodiments, the test unit 130 may extract a feature from a result image (possibly many) at each scale level. Extraction of the feature through the neural network may be sequentially or concurrently performed at each scale. For example, the test unit 130 may sequentially or concurrently perform the feature extraction for each lot-level image, each slot-level image, and each test-equipment-level image.

In some embodiments, the test unit 130 may sequentially perform feature extraction within images at one scale level. For example, in performing feature extraction for each lot, the test unit 130 may extract a feature from a corresponding result image of the DUT within a first lot, and then may extract a feature from a result image of the DUT within a second lot. Alternatively, in performing feature extraction for each test equipment, the test unit 130 may extract the feature from a result image output from a first test equipment, and then may extract a feature from the result image output from a second test equipment. Alternatively, in performing feature extraction for each slot or for each board, the test unit 130 may extract a feature from the result image of the DUT of the board inserted into the slot of a first test equipment, and then may extract a feature from the result image of the DUT of the board inserted into the slot of a second test equipment.

In some implementations, before the result image of the test is arranged for each scale, the test unit 130 may extract the feature of the result image using the neural network. The extracted feature may be arranged based on the label of the result image.

In some embodiments, the verification apparatus 100 may use a convolution neural network (CNN) or a transformer network as the neural network.

Referring to FIG. 8, a CNN may extract feature f(x) from an input result image x using two convolution layers (a convolution layer 1 and a convolution layer 2) and two pooling layers (a pooling layer 1 and a pooling layer 2). In FIG. 8, two convolution layers and two pooling layers are disposed, but this is only an example, and the CNN may include more or fewer layers than the two layers depending on performance, a time, and the like that are required for feature extraction.

Referring to FIG. 9A, a transformer network may extract a feature f (x) from an input result image x using three stages. Each stage may include a convolution token embedding block and a convolution transformer block. In FIG. 9A, the transformer network includes three stages, but this is only an example, and the transformer network may include more or fewer stages than the three stages depending on performance, a time, and the like that are required for feature extraction.

Each part of the image $x_{n-1}$ input to a Stage n by the convolution token embedding block may be embedded as a token. The image token corresponding to a part of the input image may be generated as a new token map $x_n$ by the convolution transformer block. The generated token map $x_n$ may be input to a next stage of the network. The token map output from a final stage of the transformer network may be the feature f (x) of the result image x.

FIG. 9B shows a convolution transformer block of the transformer network. Referring to FIG. 9B, when reshaping and padding are performed on the token input to the convolution transformer block and the token map is generated, a convolution projection layer may perform convolution projection for the token map. A Q (query) value, a K (key) value, and a V (value) value output from the convolution projection layer may be used for multi-head attention applied to the token map generated by the reshaping and the padding. Thereafter, the convolution transformer block may output the token map $x_n$ of the Stage n to which the convolution transformer block belongs by performing normalization and applying a multi-layer perceptron (MLP) to a result of the multi-head attention.

Thereafter, the reliability verification apparatus 100 may determine whether an abnormality occurs in a specific scale based on a comparison result between features of the result image(s) included of the specific scale and a feature of a "normal" result image (S132) (i.e., a "normal" feature extracted from an image of a known-normal lot of product). When all scale levels are determined to be "normal", the reliability verification apparatus 100 may determine that the reliability of the test is verified. However, when at least one scale is determined to be "abnormal", the verification apparatus 100 may determine that an error occurred in the test itself and may provide feedback indicating that an error was found in the test equipment (and possibly identifying a scale level and/or identifier of a test equipment, slot, etc.).

In some embodiments, a "normal" lot may be determined when collecting the result data. For example, when there are more than a predetermined number of the result data having the same lot identifier that are not indicated as "fail", the lot corresponding to the lot identifier may be determined to be a "normal" lot (i.e., a ground truth lot). Alternatively, when a predetermined ratio (e.g., 90%) or the result data having the same lot identifier does not have the "failure" indication, the lot corresponding to the lot identifier may be determined to be the "normal" lot. Thereafter, a distribution of the features of the result images of the "normal" lot may become a reference (ground truth) distribution for determining whether a target scale is "normal" or "abnormal".

In some embodiments, the test unit 130 of the reliability verification apparatus 100 may determine whether an abnormality occurred in a target scale by performing a two-sample test using the reference distribution of the "normal" lot. In the two-sample test, a null hypothesis ($h_o$) in which (i) a set ($\mathbb{P}$) of the result images of the normal lot, and (ii) a set ($\mathbb{Q}$) of the result images of the target scale are the same, is tested and an alternative hypothesis ($h_1$) in which the set ($\mathbb{P}$) and the set ($\mathbb{Q}$) are different from each other is tested. The two-sample test may be implemented as expressed by Equation 1 below.

$$h_0: \mathbb{P} = \mathbb{Q} \text{ vs } h_1: \mathbb{P} \neq \mathbb{Q} \qquad \text{Equation 1}$$

Because the set ($\mathbb{P}$) is a set of the result images of the normal lot, it may be determined that there is no abnormality in the test result indicated by the result image of the target scale when the set ($\mathbb{P}$) and the set ($\mathbb{Q}$) are the same. On the other hand, if the set ($\mathbb{P}$) and the set ($\mathbb{Q}$) are not the same, it may be determined that there is an abnormality in the test result indicated by the result image of the target scale.

In some embodiments, the test unit 130 may determine whether the set of result images of the target scale is the same as the set of result images of the normal lot by using a distance measure between the distribution of the features of the result images of the normal lot and the distribution of the features of the result images of the target scale. When the set of the result images of the target scale is determined to be substantially equivalent (e.g., within a threshold distance) to the set of the result images of the normal lot, the target scale may be determined to be "normal". However, if the set of the result images of the target scale is determined to be different from the set of the result images of the normal lot, the target scale may be determined to be "abnormal" and it may be determined that an error occurred in the test performed by the test equipment. In other words, in the last case, it may be determined that there was no problem in the manufacturing process of the product and a problem occurred in the test of the product.

Whether the target scale is "normal" or "abnormal" may be determined based on the distance measure between the distributions of the features. When the feature of the result image X of the normal lot is f(X) and the feature of the result image Y of the target scale is f(Y), the test unit 130 may calculate a statistic indicating the distance measure between a distribution of the feature f(X) of the result image X and a distribution of the feature f(Y) of the result image Y. Equation 2 below represents a maximum mean discrepancy (MMD) that may be calculated as the statistic by the test unit 130.

$$MMD(\mathbb{P}, \mathbb{Q}; \mathcal{H}_k) := \sup_{f \in \mathcal{H}, \|f\|_{\mathcal{H}_k} \leq 1} |\mathbb{E}[f(X)] - \mathbb{E}[f(Y)]| = \qquad \text{Equation 2}$$

$$\|\mu_\mathbb{P} - \mu_\mathbb{Q}\|_{\mathcal{H}_k} = \sqrt{\mathbb{E}[k(X, X') + k(Y, Y') - 2k(X, Y)]}.$$

In Equation 2, $\mathbb{P}$ is a set of the result image X and the $\mathbb{Q}$ is a set of the result image Y. k is a kernel that extracts the feature (or the feature map) of the result image X, and $\mathcal{H}_k$ is a kernel space including the kernel. The feature map of the image x extracted by the kernel k is shown in Equation 3 below.

$$k(\cdot, x) \in \mathcal{H}_k \qquad \text{Equation 3}$$

In Equation 2, $\mu_{\mathbb{P}}$ and $\mu_{\mathbb{Q}}$ are expected values E of the feature maps shown in Equation 4 below.

$$\mu_{\mathbb{P}} := \mathbb{E}[k(\cdot, X)]$$

$$\mu_{\mathbb{Q}} := \mathbb{E}[k(\cdot, Y)]$$

Equation 4

In some embodiments, the test unit 130 may use a square of the MMD in Equation 2 as the statistic to determine whether the target scale is "normal". The square of the MMD may be calculated as per Equation 5 below.

$$\widehat{\mathrm{MMD}}_u^2(S_{\mathbb{P}}, S_{\mathbb{Q}}; k) := \frac{1}{n(n-1)} \sum_{i \neq j} H_{ij}$$

$$H_{ij} := k(X_i, X_j) + k(Y_i, Y_j) - k(X_i, Y_j) - k(Y_i, X_j)$$

Equation 5

In Equation 5, $S_{\mathbb{P}}$ is a sample included in the set ($\mathbb{P}$) and the $S_{\mathbb{Q}}$ is a sample included in the set ($\mathbb{Q}$). The square of the MMD may represent a distance between empirical distributions of $S_{\mathbb{P}}$ and $S_{\mathbb{Q}}$. Therefore, a smaller square of the MMD may indicate that the set ($\mathbb{P}$) including the image X and the set ($\mathbb{Q}$) including the image Y are the same.

In some embodiments, when the statistic (the square of the MMD) calculated through Equation 5 is less than a predetermined reference value, the test unit 130 may determine that the set ($\mathbb{P}$) including the image X and the set ($\mathbb{Q}$) including the image Y are substantially the same. A fact that the set ($\mathbb{P}$) including the image X and the set ($\mathbb{Q}$) including the image Y are substantially the same may indicate that the target scale corresponding to the image Y is "normal".

Additionally, when a magnitude of the square of the MMD is greater than the predetermined reference value, the test unit 130 may determine that the set ($\mathbb{P}$) including the image X and the set ($\mathbb{Q}$) including the image Y are different from each other. A fact that the set ($\mathbb{P}$) including the image X and the set ($\mathbb{Q}$) including the image Y are different from each other may indicate that the scale corresponding to the result image Y is "abnormal".

On the other hand, the test unit 130 may determine whether the target scale is "normal" or "abnormal" by calculating Moran's I index for the result images of the target scale. When the result data indicates that there is no product that fails the test, the Moran's I index of the result image of the result data may be calculated as a relatively small value (e.g., 0.0269). When the products that fail the test are relatively evenly (or randomly) distributed in various places of the result image, the Moran's I index of the result image may be calculated as a relatively large value (e.g., 0.2514). When the products that fail the test are gathered/concentrated in a portion of the result image (are non-uniformly distributed), the Moran's I index of the result image may be calculated as a large value (e.g., 0.5484). In this case, the test unit 130 may determine that an abnormality occurred in the target scale as the Moran's I index of the result image is calculated to be a relatively large value (e.g., above some threshold). For example, when a sum of Moran's I indices of all result images of the target scale is greater than a predetermined value, the test unit 130 may determine that an abnormality occurs in the target scale.

As specified above, by analyzing result data of an image-processed test using a neural network, reliability of the test performed for a product may be verified quickly and accurately.

FIG. 10 illustrates a neural network according to one or more embodiments.

Referring to FIG. 10, the neural network 1000 may include an input layer 1010, a hidden layer 1020, and an output layer 1030. Each of the input layer 1010, the hidden layer 1020, and the output layer 1030 may include a respective set of nodes, and strengths of connections between nodes may correspond to weight values. This may be referred to as connection weight. The set of nodes included in each of the input layer 1010, the hidden layer 1020, and the output layer 1030 may be fully connected to each other, or less than fully connected. In some embodiments, the number of parameters (weight values and bias values) may be equal to the number of connections within the neural network 1000.

The input layer 1010 may include a set of input nodes $x_1$ to $x_i$, and the number of input nodes $x_1$ to $x_i$ may correspond to the number of independent input variables. For training of the neural network 1000, a training dataset may be input to the input layer 1010, and if a test dataset is input to the input layer 1010 of the trained neural network 1000, an inference result may be output from the output layer 1030 of the trained neural network 1000.

The hidden layer 1020 may be disposed between the input layer 1010 and the output layer 1030, and may include at least one hidden layer or $1020_1$ to $1020_n$ hidden layers. The output layer 1030 may include at least one output node or $y_1$ to $y_j$ output nodes. An activation function may be used in the hidden layer(s) 1020 and the output layer 1030. In some embodiments, the neural network 1000 may be learned by adjusting weight values of hidden nodes included in the hidden layer(s) 1020.

Figure 11:
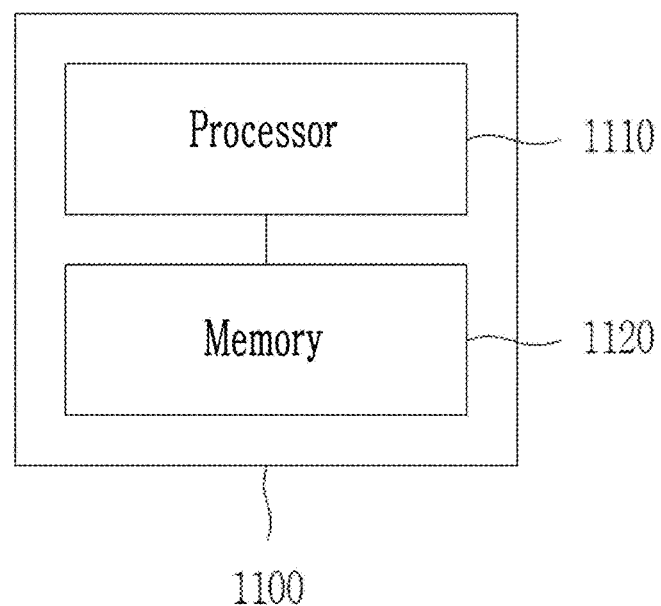
FIG. 11 illustrates a computing apparatus for verifying the reliability of the test according to one or more embodiments.

FIG. 11 illustrates a computing apparatus for verifying the reliability of a test according to one or more embodiments.

The verification apparatus may be implemented as a computer system. Referring to FIG. 11, the computer system 1100 includes a processor 1110 and a memory 1120 (the processor 1110 is representative of any single processor or any combination of processors, e.g., a CPU, a GPU, an accelerator, etc.). The memory 1120 may be connected to the processor 1110 to store various information for driving the processor 1110 or at least one program executed by the processor 1110.

The processor 1110 may implement a function, a process, or a method proposed in the embodiment. An operation of the computer system 1100 according to some embodiments may be implemented by the processor 1110.

The memory 1120 may be disposed inside or outside the processor, and the memory may be connected to the processor through various means already known. The memory may be a volatile or nonvolatile storage medium of various forms, and for example, the memory may include a read-only memory (ROM) or a random access memory (RAM).

Embodiments may be implemented by programs (in the form of source code, executable instructions, etc.) realizing the functions corresponding to the configuration of the embodiments or a recording medium (not a signal per se) recorded with the programs, which may be readily implemented by a person having ordinary skill in the art to which the present disclosure pertains from the description of the foregoing embodiments. That is to say, with the description above, an engineer or the like may readily, for example, formulate source corresponding to the description, compile the source code into instructions, and the instructions, when executed by the processor 1110 will cause the processor to perform physical operations analogous to the description above. Specifically, the method (e.g., an image preprocessing method or the like) according to some embodiments may be implemented in the form of program instructions that may be executed through various computer means to be recorded on a computer-readable medium. The computer-readable medium may include program instructions, data files, data structures, and the like, independently or in combination thereof. The program instructions recorded on the computer-readable medium may be specially designed and configured for the embodiment, or may be known to those skilled in the art of computer software so as to be used. The computer-readable recording medium may include a hardware device configured to store and execute the program instructions. For example, the computer-readable recording medium may be a hard disk, a magnetic media such as a floppy disk and a magnetic tape, an optical media such as a CD-ROM and a DVD, a magneto-optical media such as a floptical disk, a ROM, a RAM, a flash memory, or the like. The program instructions may include a high-level language code that may be executed by a computer using an interpreter or the like, as well as a machine language code generated by a compiler.

The computing apparatuses, the electronic devices, the processors, the memories, the displays, the information output system and hardware, the storage devices, and other apparatuses, devices, units, modules, and components described herein with respect to FIGS. 1-11 are implemented by or representative of hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-11 that perform the operations described in this application are performed by computing hardware, for example, by one or more processors or computers, implemented as described above implementing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions herein, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD- ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, in addition to the above disclosure, the scope of the disclosure may also be defined by the claims and their equivalents, and all variations within the scope of the claims and their equivalents are to be construed as being included in the disclosure.

What is claimed is:

1. A method for verifying reliability of a test for products performed by test equipment, the method comprising:
    receiving result images generated from preprocessing of result data of the test, the result data of the test including labels for a plurality of scale levels and the received result images including first result images belonging to a first scale level of the plurality of scale levels and second result images belonging to a second scale level of the plurality of scale levels;
    making a first determination, from the first result images, whether the first scale level is normal or abnormal;
    making a second determination, from the second result images, whether the second scale level is normal or abnormal; and
    determining that no error occurred in the test in response to both the first scale level and the second scale level being determined to be normal; or determining that an error occurred in the test in response to at least one scale level being determined to be abnormal.

2. The method of claim 1, wherein each label includes an identifier of a scale level.

3. The method of claim 2, further comprising classifying the result images by their corresponding scale levels according to the labels.

4. The method of claim 1, wherein element areas of the result images comprise respective values, each value representing an individual test result of a corresponding product.

5. The method of claim 1, wherein:
    the making the first determination is based on a first feature extracted from the first result images by a neural network; and
    the making the second determination is based on a second feature extracted from the second result images by the neural network or by another neural network.

6. The method of claim 5, wherein the neural network comprises a convolution neural network (CNN) or a transformer network.

7. The method of claim 5, wherein the making the first determination comprises:
    calculating a statistic indicating a distance measure between a distribution of features of a ground truth image corresponding to the first scale level and a distribution of features of the first result images corresponding to the first scale level; and
    making the first determination by comparing the statistic with a predetermined reference value.

8. The method of claim 7, wherein the comparing the statistic with the predetermined reference value comprises determining that the first result images satisfies a first condition based on determining that the statistic is greater than the predetermined reference value.

9. The method of claim 7,
    wherein the ground truth image is derived from ground truth test result data of a prior test performed by the test equipment.

10. An apparatus for verifying reliability of a test for products performed by test equipment, the apparatus comprising:
    one or more processors and a memory storing instructions configured to cause the one or more processors to perform a process comprising:
        receiving result images generated from preprocessing of result data of the test, the result data including labels for a plurality of scale levels and the received result images including first result images belonging to a first scale level of the plurality of scale levels and second result images belonging to a second scale level of the plurality of scale levels;
        making a first determination, from the first result images, whether the first scale level is normal or abnormal;
        making a second determination, from the second result images, whether the second scale level is normal or abnormal; and
        determining whether an error occurred in the test based on the first determination and the second determination.

11. The apparatus of claim 10, wherein each label includes an identifier of a scale level.

12. The apparatus of claim 11, wherein the process further comprises classifying the result images by their corresponding scale levels according to the labels.

13. The apparatus of claim 12, wherein the result data comprises device-under-test (dut) maps respectively associated with the labels, wherein each of the dut maps comprises element areas each comprising a value determined by the test equipment during performance of the test.

14. The apparatus of claim 10, wherein:
    the making the first determination is based on a first feature extracted from the first result images by a neural network; and
    the making the second determination is based on a second feature extracted from the second result images by the neural network or by another neural network.

15. The apparatus of claim 14, wherein the neural network comprises a convolution neural network (CNN) or a transformer network.

16. The apparatus of claim 14, wherein the making the first determination comprises:
  calculating a statistic indicating a distance measure between a distribution of features of a ground truth image corresponding to the first scale level and a distribution of features of the first result images corresponding to the first scale level; and
  making the first determination by comparing the statistic with a predetermined reference value.

17. The apparatus of claim 16, wherein the comparing the statistic with the predetermined reference value comprises:
  determining that the first result images satisfies a first condition based on determining that the statistic is greater than the predetermined reference value.

18. The apparatus of claim 16, wherein
  the ground truth image is derived from ground test result data of a prior test performed by the test equipment.

19. A system for verifying reliability of a test of products, the system comprising:
  test computers each configured to perform the test on a respective set of the products and each test computer collecting a corresponding result map having element areas indicating individual test results respectively corresponding products; and
  a reliability verification computer configured to determine whether a reliability condition of the test is satisfied based on the result maps and based on scale levels of the result maps, the scale levels corresponding to hierarchical scales in testing the products.

20. The system of claim 19, wherein
  the hierarchal scales includes at least two of: a lot-level scale representing a production block of the products, a board-level scale of boards on which the products are installed for the test, a slot-level scale for the boards to interface with the test computers, and an equipment-level scale of the test computers performing the test on the products installed on the boards.

* * * * *